United States Patent
Bandari et al.

(10) Patent No.: US 7,777,956 B2
(45) Date of Patent: Aug. 17, 2010

(54) MICRO-LENS ARRAYS AND CURVED SURFACE FABRICATION TECHNIQUES

(75) Inventors: Rajmohan Bandari, Salt Lake City, UT (US); Sandeep Negi, Salt Lake City, UT (US); Florian Solzbacher, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 12/129,655

(22) Filed: May 29, 2008

(65) Prior Publication Data

US 2008/0297910 A1 Dec. 4, 2008

Related U.S. Application Data

(60) Provisional application No. 60/932,232, filed on May 29, 2007.

(51) Int. Cl.
*G02B 27/10* (2006.01)
(52) U.S. Cl. .................... 359/618; 359/619
(58) Field of Classification Search ........ 359/618, 359/619
See application file for complete search history.

(56) References Cited

U.S. PATENT DOCUMENTS

| 5,061,025 | A | * | 10/1991 | Debesis | ........... | 359/18 |
|---|---|---|---|---|---|---|
| 5,838,715 | A | | 11/1998 | Corzine et al. | | |
| 5,871,653 | A | | 2/1999 | Ling | | |
| 6,707,612 | B2 | | 3/2004 | Ohtsu | | |
| 6,884,732 | B2 | * | 4/2005 | Najafi et al. | ........... | 438/713 |
| 6,980,282 | B2 | | 12/2005 | Choi et al. | | |
| 7,118,942 | B1 | | 10/2006 | Li | | |
| 2004/0016718 | A1 | | 1/2004 | Hwu et al. | | |
| 2006/0110100 | A1 | | 5/2006 | Blauvelt et al. | | |
| 2007/0217005 | A1 | * | 9/2007 | Novet et al. | ........... | 359/459 |
| 2008/0138583 | A1 | * | 6/2008 | Bhandari et al. | ........... | 428/156 |

OTHER PUBLICATIONS

Shin, et al., "A New Approach to Polymeric Microlens Array Fabrication Using Soft Replica Molding", IEEE Photonic Technology Letters, vol. 16, No. 9, Sep. 2004, pp. 2078-2080.
Chou, et al., "Fabrication of Out-Of-Plane Curved Surfaces in SI by Utilizing RIE Lag", IEEE, 2002, pp. 145-148.

* cited by examiner

*Primary Examiner*—Jordan M. Schwartz
*Assistant Examiner*—James C Jones
(74) *Attorney, Agent, or Firm*—Thorpe North & Western LLP

(57) ABSTRACT

A method of fabricating a sub-millimeter scale curved surface on a substrate (10) includes cutting a plurality of trenches (12) of varying depth into the substrate (10). The depth of the trenches (12) corresponds to a desired surface profile. The substrate (10) is etched to remove material left (16) between the trenches to form the curved surface.

10 Claims, 5 Drawing Sheets

MICRO-LENS ARRAYS AND CURVED SURFACE FABRICATION TECHNIQUES

RELATED APPLICATION

This application claims the benefit of U.S. Provisional Patent Application No. 60/932,232, filed May 29, 2007 which is incorporated herein by reference.

BACKGROUND

1. Field of the Invention

The present invention relates generally to fabrication of micro-lenses and arrays of micro-lenses and other microscopic structures having curved surfaces. As such the invention related generally to optics, materials science and micro-level manufacturing.

2. Related Art

Micro-Electro-Mechanical Systems (MEMS) are devices which integrate microscopic scale components on a common substrate. Digital mirror devices are one example of a MEMS device that has achieved market success as used within projection televisions.

Fabrication of MEMS devices is sometimes referred to as micromachining. Micromachining can be performed using integrated circuit (IC) processing sequences such as photolithography to define features on a substrate. Silicon is a popular substrate material. Typically, the features manufacturing in photolithography are substantially planar, with deposited or removed layers of material being only a few micrometers thick and generally of uniform thickness. Features are for the most part defined by vertical boundaries, although slopes can be achieved using, for example, directional (non-isotropic) etching (e.g., potassium hydroxide etching of silicon).

There is a desire to produce components within MEMS devices that have a non-planar surface topography. For example, integrated optical systems use micro-lenses or micro-mirrors having diameters between about 1 micrometer to several hundred micrometers. Fabricating curved surfaces of a micro-lens or micro-mirror can be particularly difficult. Some success has been achieved with so-called gray scale lithography, however gray scale masks can be expensive and the photolithography process must be tightly controlled.

Alternate approaches for fabricating non-planar surface in a MEMS device include molding desired features into a polymer material. Long term stability and reliability of polymer material can be a concern.

SUMMARY

Accordingly, the present inventors have recognized the need for an alternate method of fabricating non-planar sub-millimeter scale features. Briefly, and in general terms, one embodiment of the invention is directed to a method of fabricating a sub-millimeter scale curved surface on a substrate. The method can include cutting a plurality of trenches of varying depth into the substrate. The depth of the trenches can correspond to a desired surface profile. Another step of the method can include etching the substrate to remove material left between the trenches to form the curved surface.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1A:
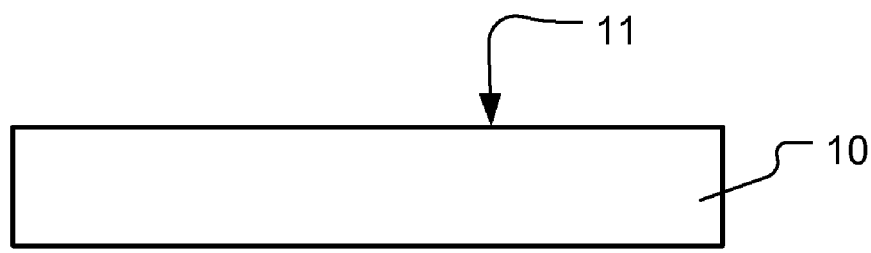
FIG. 1(a) is a side view illustration of a substrate in accordance with an embodiment of the present invention.

These figures are provided for purposes of illustration and clarity and are not intended to be limiting of the invention. As such, various dimensions and configurations can and likely will deviate from those illustrated.

DETAILED DESCRIPTION OF EXAMPLE EMBODIMENT(S)

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing embodiments of the present invention, the following terminology will be used.

It must be noted that, as used in this specification and the appended claims, the singular forms "a," "an," and "the" include plural referents unless the context clearly dictates otherwise. Thus, for example, reference to "a trench" includes reference to one or more of such trenches and reference to "masking" refers to one or more of such processing steps.

As used herein, "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of action, characteristic, property, state, structure, item, or result.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1-10 micrometers should be interpreted to include not only the explicitly recited values of about 1 micrometer and about 10 micrometers, but also include individual values and sub-ranges within the indicated range. Thus, included in this numerical range are individual values such as 6, 7, and 8 micrometers, and sub-ranges such as 1-5 micrometers, 5-10 micrometers, and 2-8 micrometers, etc. This same principle applies to ranges reciting only one numerical value and should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. Further, unless otherwise stated, the term "about" shall expressly include "exactly," consistent with the discussion above regarding ranges and numerical data.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Figure 1B:
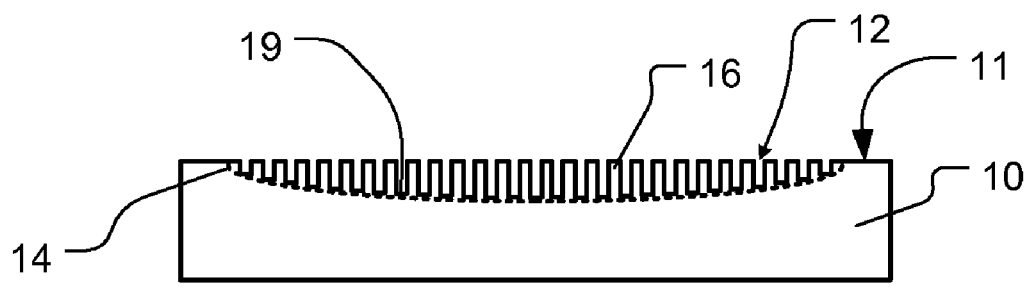
FIG. 1(b) is a side view illustration of the substrate of FIG. 1(a) after a plurality of trenches have been cut into the substrate in accordance with an embodiment of the present invention.
Figure 1C:
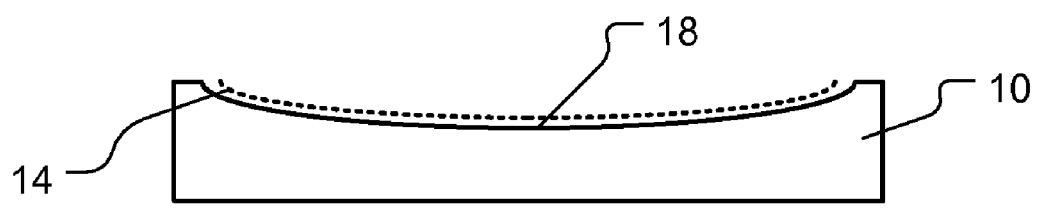
FIG. 1(c) is a side view illustration of the substrate of FIG. 1(b) after material between the trenches has been removed to form a curved surface in accordance with an embodiment of the present invention.

FIG. 1(a) through 1(c) illustrates a micro-lens being fabricated in accordance with an embodiment of the present invention. The micro-lens can be fabricated on a provided substrate 10. For example, the substrate may be silicon (e.g., polycrystalline or single crystal, including silicon-on-insulator), ceramic, semiconductor (e.g., gallium arsenide, germanium, etc.), polymer material, quartz, glass, composites thereof, or other suitable material. A plurality of trenches 12 of varying depth can be cut into a top surface 11 of the substrate as shown in FIG. 1(b) leaving residual material 16 between the trenches. The trenches define a non-planar or curved profile 14. The cutting is performed mechanically, for example, using a dicing saw. Cutting depths and lens dimensions can vary considerably depending on the desired final shape. The depth may vary, as a particular example, between about 50 micrometers and about 1000 micrometers. For example, a radius of curvature to form a micro lens can be produced within the range of about 250 micrometers to about 4 millimeters. Diameters of micro-lenses may range from about 50 micrometers to about 5 millimeters. In one specific embodiment, the micro-lenses can have a maximum dimension of less than 1 millimeter. Further, in some embodiments, micro-lenses can be fabricated for specific applications which require non-circular lenses, e.g. elliptical, aspheric, blocky, etc.

The residual material 16 can be removed using a chemical etchant. For example, an isotropic etching can be particular suited to form the desired curved surface 18. For example, silicon can be etched using a solution of hydrofluoric acid, as well as other known etchants. For example, a mixture of hydrofluoric acid, nitric acid, and acetic acid (HNA) is a useful etchant. It will be appreciated that the curved surface corresponds to the profile 14, but is displaced somewhat deeper into the substrate relative to the profile, since etching also removes some material from the substrate from the bottom of the trenches 19. Thus, the profile 14 can be carefully designed so that the desired final lens shape is achieved after etching. Such profile design can be readily performed by theoretical calculations, simulation, and/or routine experimentation. A suitable etching time can be readily chosen to balance residual material and providing the desired profile without removing excessive material.

Further, the processing of the present invention can also result in surface contours which are extremely smooth on a nanoscale and can provide improved performance with reduced manufacturing costs. For example, in some embodiments, the surface roughness can be below about 2 angstroms and often below about 50 nanometers, although other roughness can also be suitable depending on the particular application. In one aspect, the curved surface can be substantially free of curvature defects, i.e. a smoothly arced profile sufficient to satisfy product parameters such as aberration, focal point, etc.

Figure 2:
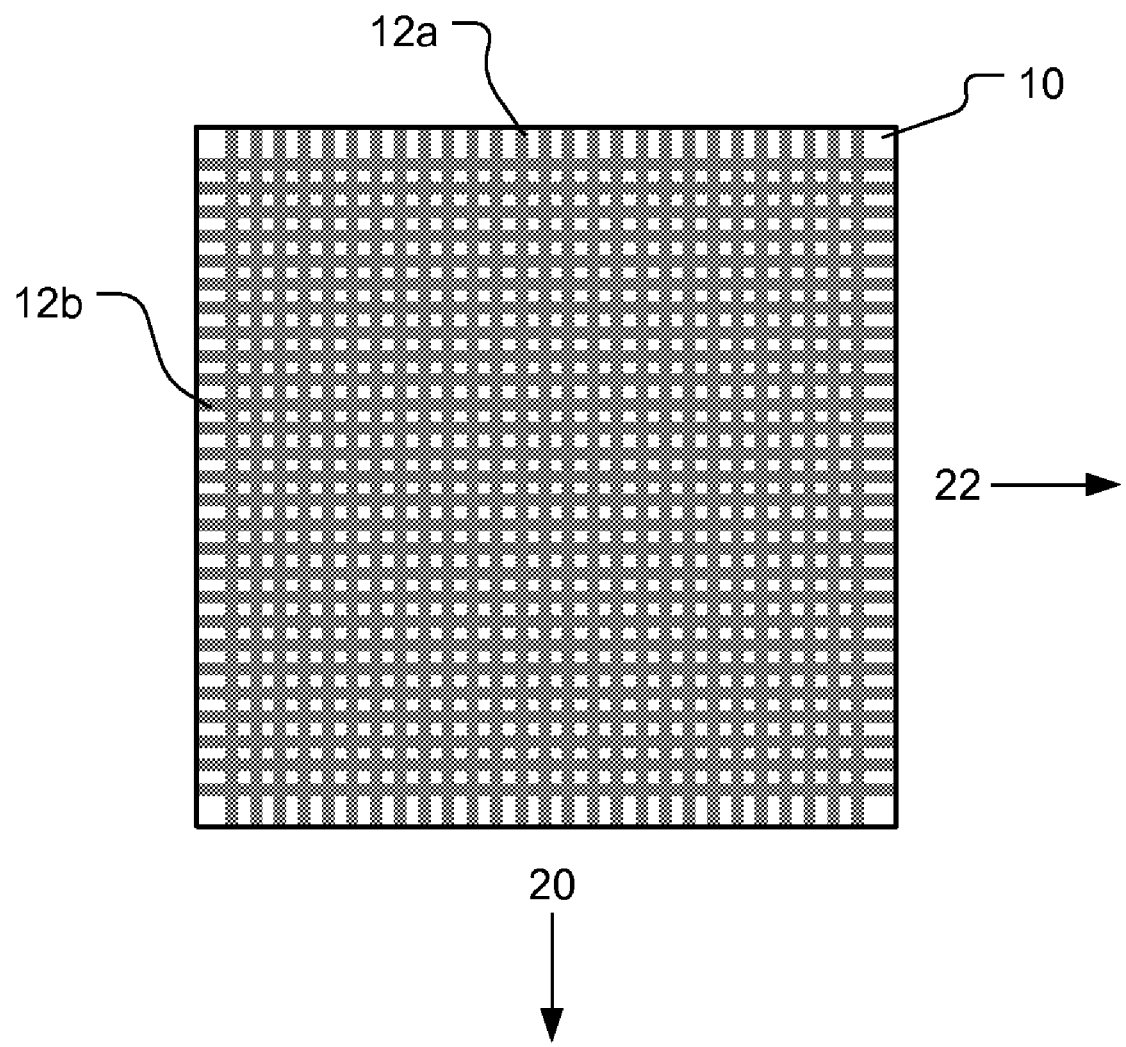
FIG. 2 is a top view illustration of a substrate having a first plurality of trenches and a second plurality of trenches cut into the top surface in accordance with an embodiment of the present invention.

More than one plurality of trenches may be cut into the substrate to define a more complex profile. For example, as shown in top view in FIG. 2, a first plurality 12a of trenches may be cut into the substrate in one horizontal direction 20, and a second plurality of trenches 12b be cut into the substrate in a second horizontal direction 22. The trenches are at an angle relative to each other, the angle being measured in the horizontal plane defined by the saw movement when making the cuts. The first plurality of trenches may, for example, be orthogonal (90 degree angle as in FIG. 2) relative to the second plurality of trenches as shown here, although this is not essential.

By cutting trenches in more than one direction, a three-dimensional surface profile can be defined. In other words, by varying the depth of the first plurality of trenches 12a, the profile is non-planar in the first direction 20, and by varying the depth of the second plurality of trenches 12b, the profile is non-planar in the second direction 22. If desired, additional pluralities of trenches can be cut at additional angles to provide even more control over the profile, and in turn the resulting shape of the curved surface after etching.

Trenches can be parallel cuts, although this is not essential. If desired, trenches may be cut at a plurality of angles relative to each other. Furthermore, trenches need not be cut perpendicularly into the top surface of the substrate. For example, the saw can be angled relative to perpendicular or normal to the surface. Some curve shapes may be more efficiently fabricated by using a combination of angled cuts.

Figure 3A:
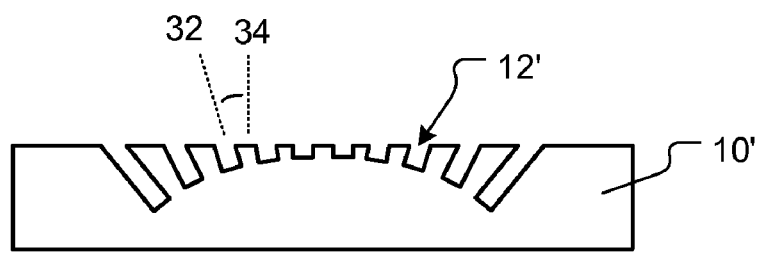
FIG. 3(a) is a side view illustration of a substrate having a plurality of trenches cut into a top surface in accordance with an embodiment of the present invention.
Figure 3B:
FIG. 3(b) is another side view illustration of the substrate of FIG. 3(a)
Figure 3C:
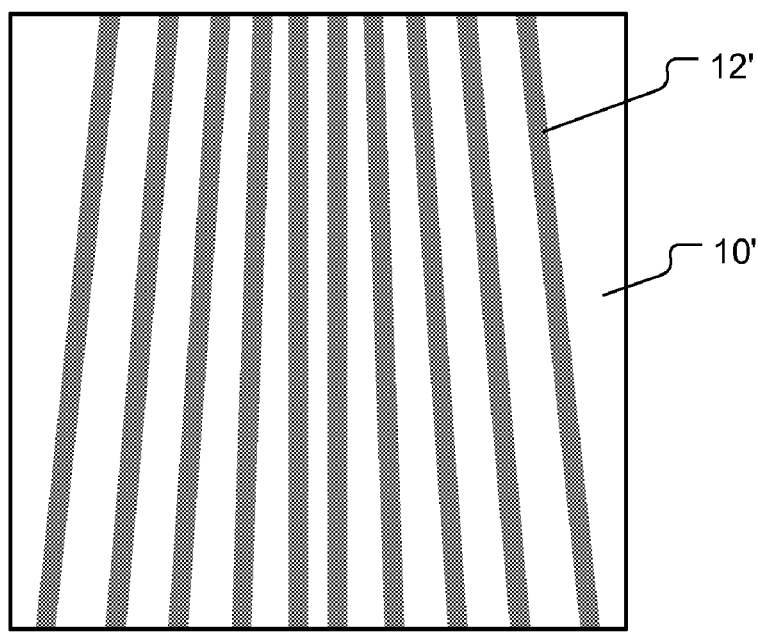
FIG. 3(c) is a top view illustration of the substrate of FIG. 3(a)

FIG. 3(a), FIG. 3(b), and FIG. 3(c) illustrate side views and top view of a substrate 10' which has been cut with trenches 12' angled 32 relative to the vertical 34, and angled relative to each other. It will be noted from the side view in FIG. 3(b) that the depth of the bottoms 19' of the trenches can also optionally be varied along the length of the cuts. Similarly, FIG. 3(c) illustrates non-parallel cuts which are slightly angled from one another. Accordingly, extremely complex profiles can be created within the constraints of the controllability of the saw or other method used to form the trenches.

To form a mirror, a reflective material can be deposited (by sputtering, evaporation etc.) on the curved surface after etching. Non-limiting examples of suitable reflective material can include aluminum, silver, gold, platinum, or other reflective metal. Alternately, if desired, optical coatings such as dielectric coatings (e.g. calcium fluoride, magnesium fluoride, metal oxides, etc.), high-reflection coatings (e.g. silicon dioxide, titanium dioxide, zinc sulfide, magnesium fluoride, etc.), anti-reflection coatings, multi-layer coatings, and/or composite coatings may be applied to the curved surface to vary optical properties and/or form complex lenses. Suitable reflective materials and optical coatings are well known to those skilled in the art and can be selected based on the teachings herein for particular applications.

Figure 4:
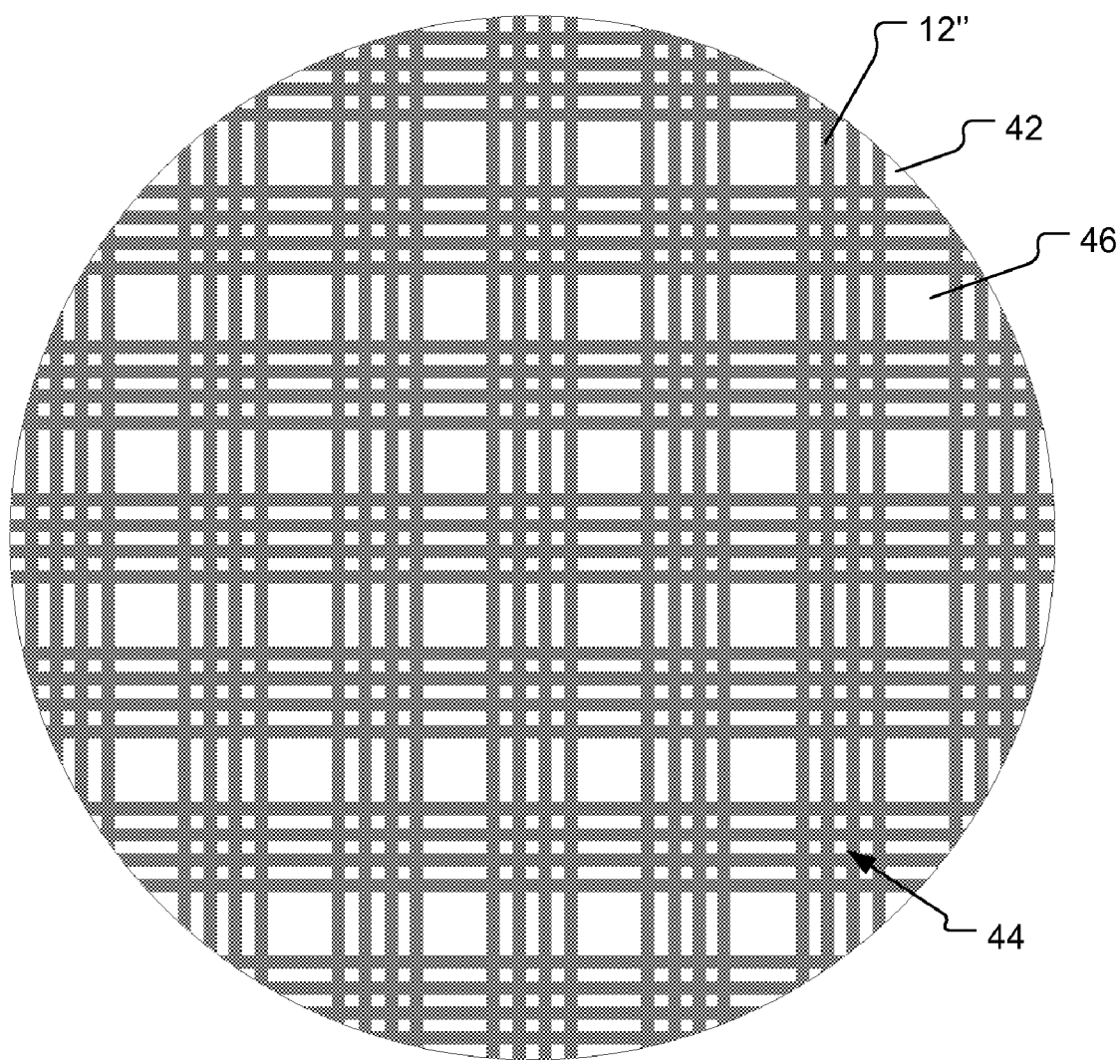
FIG. 4 is a top view illustration of a wafer having an array of curved surfaces in accordance with an embodiment of the present invention.

The process for forming the curved surface as just described is compatible with semiconductor processing steps. Accordingly, if desired, semiconductor devices may be formed on the substrate either before or after fabricating the curved surface. For example, as illustrated in FIG. 4, trenches 12" may be cut into portions of a wafer 42 (e.g. to form a curved lens or mirror at intersections 44 of trenches). The trenches may have varying depth, as described above. Depth of the trenches may be varied to define predefined radius of curvature for each curved portion. Other portions 46 of the wafer may be reserved for electronic devices. Upon completion of fabrication, if desired, the wafer may be separated into individual devices using a dicing saw. Because fabrication can be performed on a wafer scale, high throughput manufacturing may be obtained.

It will be appreciated that various shapes of curved surfaces can be formed. In general, the curved surface can present a three-dimensional curve, in that the depth of the curved surface z relative to the original horizontal top surface of the substrate can be described as a function of the horizontal position x, y in two-dimensions on the top surface z=f(x, y). Achievable surface shapes will be a function of the saw width, depth control (e.g., depth resolution), cutting angle control (e.g. vertical miter angle), rotational control of substrate (e.g. horizontal miter angle), etc.

Figure 5:
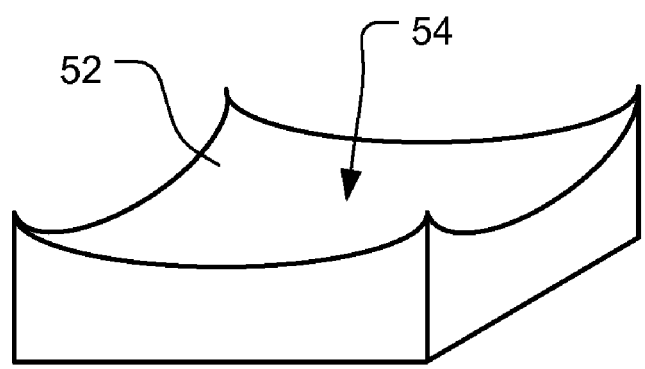
FIG. 5 is a perspective view illustration of a concave surface in accordance with an embodiment of the present invention.
Figure 6:
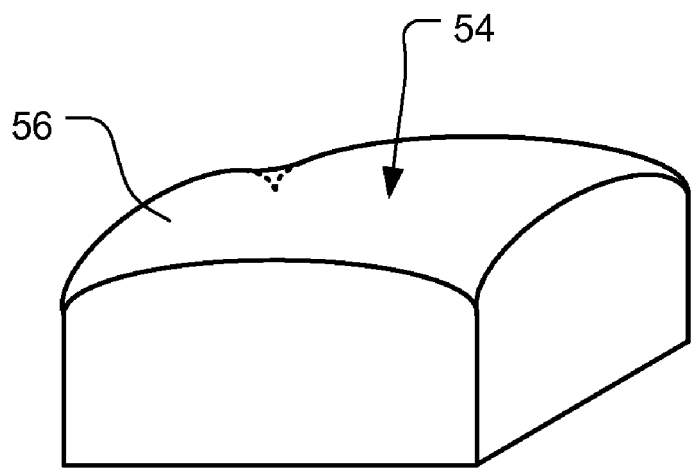
FIG. 6 is a perspective view illustration of a convex surface in accordance with an embodiment of the present invention.

The curved surface can, for example, be concave or convex relative to the top surface of the substrate. For example, as shown in perspective view in FIG. 5, a concave curved surface 52 can be formed by increasing the depth of the trenches near the center 54 of the curved surface. Trenches generally pass straight horizontally across and can limit the radius of curvature. However, this is somewhat mitigated by the removal process which tends to deepen the trenches beyond the edges of the cuts. Alternately, as shown in perspective view in FIG. 6, a convex curved surface 56 can be formed by decreasing the depth of the trenches near the center of the curved surface. As another example, the curved surface may be concave in one direction and convex in another direction (e.g., a saddle shape), or more complex curvatures can be formed. However, for micro-lens arrays, a cylindrical surface can be particularly suitable, i.e. having a constant cross-section profile down the length of the lens.

In another alternative embodiment, a substrate having a curved surface formed as disclosed herein can be used as a mold for fabrication of curved surfaces in a polymer material. For example, the substrate may be used as a mold onto which a polymer is poured and cured to take the curved surface shape. As another example, the substrate may be used as a mold for embossing or contact printing the curved surface shape into a material.

Summarizing and reiterating to some extent, techniques for forming sub-millimeter scale non-planar surfaces on a substrate have been described. One advantage of the techniques is that no masking is required to form the curved surface. Simple processing steps of cutting and isotropic etching can be used instead. Accordingly, the expense and processing steps of making the masks and photolithography can be avoided. Micro-lenses can be formed and integrated with electronics devices. Non-limiting examples of applications can include charge coupled devices (CCDs), CMOS active pixel sensors (APS), photodiode arrays, hybrid focal plane arrays, and the like. Other applications can include sensors for astrological study which utilize terhertz sensors.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

What is claimed is:

1. A method of fabricating a sub-millimeter scale curved surface on a substrate comprising:
   providing a substrate;
   cutting a first plurality of trenches of varying depth into the substrate, wherein a depth of the trenches corresponds to a desired surface profile;
   cutting a second plurality of trenches of varying depth into the substrate, the second plurality of trenches at an angle to the first plurality of trenches, the depth of the trenches corresponding to a three-dimensional desired surface; and
   etching the substrate to remove material left between the trenches to form the curved surface.

2. The method of claim 1, wherein the first plurality of trenches is orthogonal to the second plurality of trenches.

3. The method of claim 1, further comprising cutting a third plurality of trenches angled relative to the first plurality of trenches and to the second plurality of trenches.

4. The method of claim 1, wherein the first plurality of trenches has a depth between about 50 micrometers and about 1000 micrometers.

5. The method of claim 1, further comprising depositing a reflective material on the curved surface.

6. The method of claim 1, further comprising forming electronic devices on the substrate.

7. The method of claim 1, further comprising using the curved surface of the substrate as a mold for fabricating a curved surface into a polymer.

8. The method of claim 1, wherein the curved surface is substantially free of curvature defects.

9. The method of claim 1, wherein the substrate comprises silicon or a polymer.

10. A product formed by the method of claim 1.

* * * * *